US012782963B2

(12) United States Patent
Feng

(10) Patent No.: US 12,782,963 B2
(45) Date of Patent: Nov. 3, 2026

(54) FLIGHT CONTROL METHOD AND APPARATUS FOR UNMANNED AERIAL VEHICLE, STORAGE MEDIUM AND ELECTRONIC APPARATUS

(71) Applicant: AUTEL ROBOTICS CO., LTD., Shenzhen (CN)

(72) Inventor: Yinhua Feng, Shenzhen (CN)

(73) Assignee: AUTEL ROBOTICS CO., LTD., Nanshan Dist. Shenzhen (CN)

( * ) Notice: Subject to any disclaimer, the term of this patent is extended or adjusted under 35 U.S.C. 154(b) by 198 days.

(21) Appl. No.: 18/600,153

(22) Filed: Mar. 8, 2024

(65) Prior Publication Data

US 2025/0251736 A1 Aug. 7, 2025

(30) Foreign Application Priority Data

Mar. 10, 2023 (CN) ......................... 202310260616.1

(51) Int. Cl.
*G05D 1/644* (2024.01)
*B60L 58/13* (2019.01)
(Continued)

(52) U.S. Cl.
CPC .............. *G05D 1/644* (2024.01); *B60L 58/13* (2019.02); *G05D 1/654* (2024.01); (Continued)

(58) Field of Classification Search
CPC ........ G05D 1/644; G05D 1/654; G05D 1/106; G05D 2109/20; B60L 58/13; B60L 2200/10; B60L 2260/54
See application file for complete search history.

(56) References Cited

U.S. PATENT DOCUMENTS 9,688,403 B2 * 6/2017 Winn .................. G05D 1/0202
11,577,848 B1 * 2/2023 Foland ................ G07C 5/0825
(Continued)

FOREIGN PATENT DOCUMENTS

CN 105539843 A 5/2016
CN 108241377 A 7/2018
(Continued)

OTHER PUBLICATIONS

The First Chinese Office Action dated May 28, 2025; Appln. 202310260616.2 with English Translation.

*Primary Examiner* — Ramya P Burgess

(57) ABSTRACT

Embodiments of the present invention provide a flight control method and apparatus for an unmanned aerial vehicle, a storage medium and an electronic apparatus. The method includes: acquiring a target control request of the unmanned aerial vehicle during execution of target flight tasks; detecting current energy consumption data of the unmanned aerial vehicle in response to the target control request, the current energy consumption data indicating a current energy consumption condition of the unmanned aerial vehicle; calculating remaining navigation parameters of the unmanned aerial vehicle according to the current energy consumption data and current ground speed, the remaining navigation parameters indicating a navigation time of the unmanned aerial vehicle before landing, the current ground speed indicating a current flight speed of the unmanned aerial vehicle relative to ground; and controlling the unmanned aerial vehicle to execute remaining flight tasks in the target flight tasks according to the remaining navigation parameters.

20 Claims, 4 Drawing Sheets

(51) Int. Cl.
*G05D 1/654* (2024.01)
*G05D 109/20* (2024.01)

(52) U.S. Cl.
CPC ....... *B60L 2200/10* (2013.01); *B60L 2260/54* (2013.01); *G05D 2109/20* (2024.01)

(56) References Cited

U.S. PATENT DOCUMENTS

| | | | | |
|---|---|---|---|---|
| 11,738,866 | B1 * | 8/2023 | Rysdyk .................. | G05D 1/042 701/18 |
| 2015/0142211 | A1 * | 5/2015 | Shehata ................... | G08G 5/57 701/2 |
| 2016/0216711 | A1 * | 7/2016 | Srivastava ............... | G08G 5/22 |
| 2019/0025828 | A1 * | 1/2019 | Kuhara ................ | G05D 1/0088 |
| 2019/0114929 | A1 * | 4/2019 | Sasaki .................... | B64U 50/19 |
| 2020/0066031 | A1 * | 2/2020 | Neubauer .............. | G01C 23/00 |

FOREIGN PATENT DOCUMENTS

| | | | | |
|---|---|---|---|---|
| CN | 112135776 | A | 12/2020 | |
| CN | 113484765 | A | 10/2021 | |
| CN | 114167895 | A | 3/2022 | |
| CN | 115334591 | A | * 11/2022 | ............. G06N 3/006 |
| WO | WO2022127754 | A1 | 6/2022 | |

* cited by examiner

FLIGHT CONTROL METHOD AND APPARATUS FOR UNMANNED AERIAL VEHICLE, STORAGE MEDIUM AND ELECTRONIC APPARATUS

CROSS REFERENCE TO RELATED DISCLOSURE

This patent application claims the benefit of and priority to Chinese Patent Application No. 202310260616.1, filed Mar. 10, 2023, the entirety of which is hereby incorporated herein by reference.

BACKGROUND

At present, in a case that an unmanned aerial vehicle is required to perform a flight task, the unmanned aerial vehicle needs to plan a flight route according to actual flight tasks. A flight mileage required by the unmanned aerial vehicle to perform the flight task is roughly calculated through parameter information such as a distance and a flight height included in the flight task. The unmanned aerial vehicle may be in a turned-off state while acquiring the flight task. Therefore, in the process of performing the flight task according to the flight route, the unmanned aerial vehicle may fail to complete the flight task due to an insufficient electric capacity, resulting in the instability of the unmanned aerial vehicle performing the flight task.

In view of low stability and other problems of unmanned aerial vehicles performing flight tasks, no effective solution has been proposed.

SUMMARY

Embodiments of the present invention relate to the communication field, and more particularly, to a flight control method and apparatus for an unmanned aerial vehicle, a storage medium and an electronic apparatus.

Embodiments of the present invention provide a flight control method and apparatus for an unmanned aerial vehicle, a storage medium and an electronic apparatus, which at least solves the problem of low stability of unmanned aerial vehicles performing flight tasks in related technologies.

According to an embodiment of the present invention, a flight control method for an unmanned aerial vehicle is provided. The flight control method includes:

- acquiring a target control request of the unmanned aerial vehicle in a process of executing target flight tasks by the unmanned aerial vehicle, the target control request being configured to request flight control of the unmanned aerial vehicle;
- detecting current energy consumption data of the unmanned aerial vehicle in response to the target control request, the current energy consumption data being configured to indicate a current energy consumption condition of the unmanned aerial vehicle;
- calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and
- controlling the unmanned aerial vehicle to execute remaining flight tasks in the target flight tasks according to the remaining navigation parameters.

According to the second aspect of the present invention, a flight control apparatus for an unmanned aerial vehicle is provided. The flight control apparatus includes:

- an acquiring module, configured to acquire a target control request of the unmanned aerial vehicle in a process of executing target flight tasks by the unmanned aerial vehicle, the target control request being configured to request flight control of the unmanned aerial vehicle;
- a responding module, configured to detect current energy consumption data of the unmanned aerial vehicle in response to the target control request, the current energy consumption data being configured to indicate a current energy consumption condition of the unmanned aerial vehicle;
- a calculating module, configured to calculate remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and
- a control module, configured to control the unmanned aerial vehicle to execute remaining flight tasks in the target flight tasks according to the remaining navigation parameters.

According to the third embodiment of the present invention, a computer-readable storage medium is further provided, having stored a computer program therein, the computer program being configured to implement the steps in any of the above method embodiments while in operation.

According to the forth embodiment of the present invention, an electronic apparatus is further provided. The electronic apparatus includes a memory and a processor, wherein the memory is configured to store a computer program therein, and the processor is configured to operate the computer program so as to perform the steps in any one of the above method embodiments.

DETAILED DESCRIPTION

Embodiments of the present invention will be described below in detail with reference to the accompanying drawings and in conjunction with embodiments.

It should be noted that the terms "first", "second" and the like in the description and claims, as well as the above-mentioned drawings, of the present invention are used to distinguish similar objects, but not necessarily used to describe a specific order or precedence order.

Figure 1:
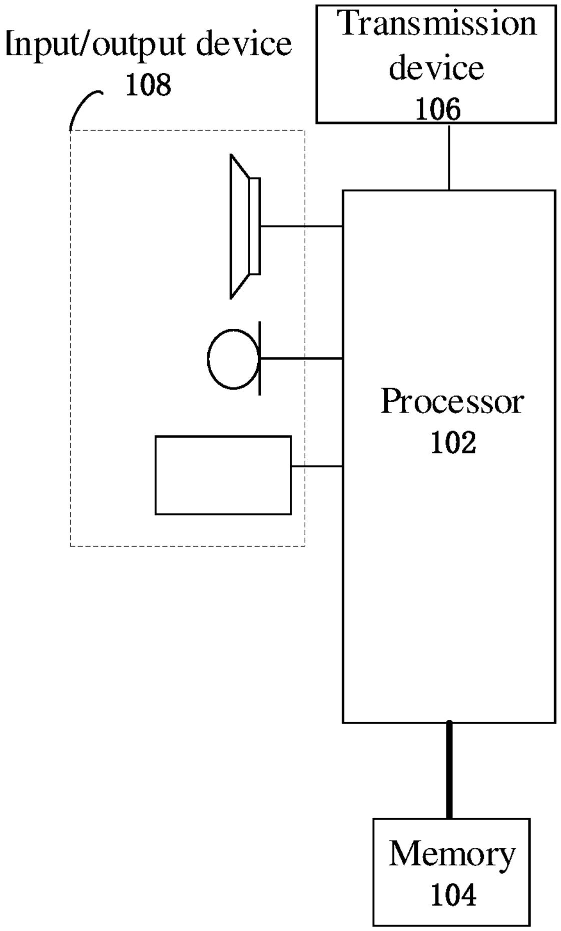
FIG. 1 is a block diagram of a hardware structure of a mobile terminal in a flight control method for an unmanned aerial vehicle according to an embodiment of the present invention.

The method embodiment provided in the embodiments of the present application may be executed in a mobile terminal, a computer terminal, or a similar computing apparatus. Taking being operated on the mobile terminal as an example, FIG. 1 is a block diagram of a hardware structure of a mobile terminal in a flight control method for an unmanned aerial vehicle according to an embodiment of the present invention. As shown in FIG. 1, the mobile terminal may include one or more (only one is shown in FIG. 1) processors 102 (the processor 102 may include, but not limited to, a processing apparatus such as a microprocessor MCU or a programmable logic device FPGA), and a memory 104 configured to store data. The mobile terminal may further include a transmission device 106 and an input/output device 108 for communication functions. A person of ordinary skill in the art may understand that the structure shown in FIG. 1 is only for illustration, and is not intended to limit the structure of the mobile terminal. For example, the mobile terminal may further include more or fewer components than those shown in FIG. 1, or have a different configuration from that shown in FIG. 1.

The memory 104 may be configured to store computer programs, for example, software programs and modules of application software, such as computer programs corresponding to the flight control method for an unmanned aerial vehicle in an embodiment of the present invention. The processor 102 executes various functional applications and data processing, i.e., implements the above method, by operating the computer programs stored in the memory 104. The memory 104 may include a high-speed random access memory, and may also include a non-volatile memory, such as one or more magnetic storage devices, a flash memory, or other non-volatile solid-state memory. In some examples, the memory 104 may further include a memory remotely provided with respect to the processor 102. These remote memories may be connected to the mobile terminal via a network. Examples of the networks include, but are not limited to, the Internet, an intranet, a local area network, a mobile communication network, and combinations thereof.

The transmission device 106 is configured to receive or send data via a network. The specific examples of the network may include a wireless network provided by a communication provider of the mobile terminal. In one example, the transmission device 106 includes a network interface controller (NIC), which may be connected to other network devices through a base station to communicate with the Internet. In an example, the transmission device 106 may be a radio frequency (RF) module, which is configured to communicate with the Internet in a wireless manner.

Figure 2:
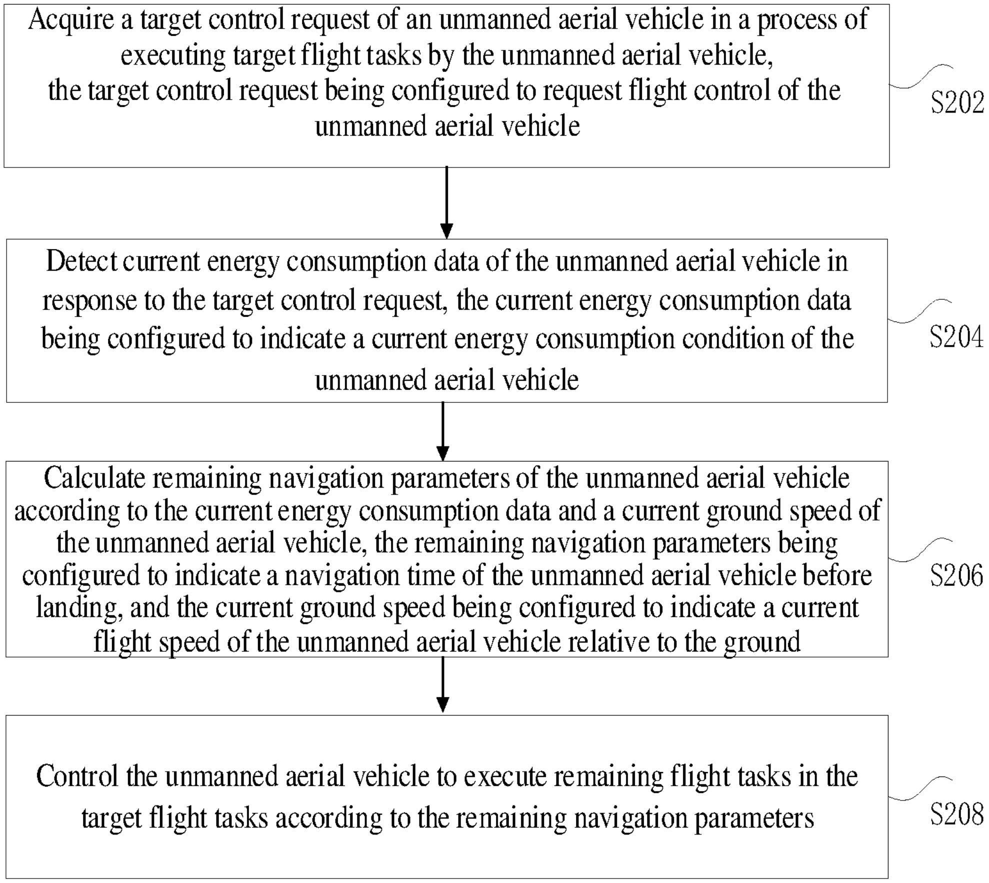
FIG. 2 is a flow chart of flight control of the unmanned aerial vehicle according to an embodiment of the present invention.

In the present embodiment, a flight control method for an unmanned aerial vehicle that operates on the mobile terminal is provided. FIG. 2 is a flow chart of flight control of the unmanned aerial vehicle according to an embodiment of the present invention. As shown in FIG. 2, this flow includes the following steps:

step S202: acquiring a target control request of the unmanned aerial vehicle in a process of executing target flight tasks by the unmanned aerial vehicle, the target control request being configured to request flight control of the unmanned aerial vehicle;

step S204: detecting current energy consumption data of the unmanned aerial vehicle in response to the target control request, the current energy consumption data being configured to indicate a current energy consumption condition of the unmanned aerial vehicle;

step S206: calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and step S208: controlling the unmanned aerial vehicle to execute remaining flight tasks in the target flight tasks according to the remaining navigation parameters.

Through the above steps, in the process of performing the flight tasks, the unmanned aerial vehicle may estimate the remaining flight time to ensure that it can land safely according to the flight information such as the current energy consumption data and the ground speed, so as to re-plan an execution mode of the remaining flight tasks in the currently executed flight tasks according to the remaining flight time, that is, to ensure that the unmanned aerial vehicle can complete the execution of the remaining flight tasks within the existing power capacity, and to ensure that the unmanned aerial vehicle can land safely. Therefore, the problem of low stability of the unmanned aerial vehicle in the process of executing the flight tasks can be solved, thereby achieving an effect of improving the stability of the unmanned aerial vehicle in the process of executing the flight tasks.

Optionally, in the present application, the flight control process of the unmanned aerial vehicle may, but not limited to, be applied to a control terminal of the unmanned aerial vehicle, or may also be applied to a server with a control function for the unmanned aerial vehicle. The unmanned aerial vehicle is controlled by using the server.

In the technical solution provided by the step S202, the target flight tasks may, but not limited to, be used to plan a flight route of the unmanned aerial vehicle before the unmanned aerial vehicle takes off, or change the flight route of the unmanned aerial vehicle again on the way of the flight of the unmanned aerial vehicle.

Optionally, in the present embodiment, the unmanned aerial vehicle may, but not limited to, be controlled by acquiring a control request issued by the control terminal of the unmanned aerial vehicle. The control request may, but not limited to, be used to control the acquisition of flight data during the flight of the unmanned aerial vehicle, or control a flight route of the unmanned aerial vehicle during the execution of flight tasks, etc.

Optionally, in the present embodiment, the unmanned aerial vehicle may, but not limited to, have a plurality of flight tasks. A flight task which is being executed by the unmanned aerial vehicle may, but not limited to, be determined as the target flight task.

In an exemplary embodiment, the target control request of the unmanned aerial vehicle may be acquired by using the following manners which may include, but not limited to, one of the followings: receiving the target control request sent by the controller corresponding to the unmanned aerial vehicle; detecting a remaining electric capacity of the unmanned aerial vehicle; predicting whether the remaining electric capacity can complete the target flight task; predicting whether the remaining electric capacity is capable of completing the target flight task; and determining that the target control request is acquired in a case that the remaining electric capacity is predicted to be unable to complete the target flight task.

Optionally, in the present embodiment, the controller may be, but not limited to, an apparatus that converts a user instruction into an instruction that can be recognized by the unmanned aerial vehicle, or is capable of issuing a control instruction for controlling the unmanned aerial vehicle to the unmanned aerial vehicle.

Optionally, in the present embodiment, the above target control request may be used, but not limited, to indicate the timing of the unmanned aerial vehicle to detect the remaining electric capacity. That is, the unmanned aerial vehicle may, but not limited to, acquire the remaining electric capacity by accepting the target control request sent by the controller.

Optionally, in the present embodiment, the above remaining electric capacity may include, but not limited to, an electric capacity percentage of a battery of the unmanned aerial vehicle, and a reserved electric capacity that may, but not limited to, be used by the unmanned aerial vehicle in the event of an accident.

Optionally, in the present embodiment, whether the unmanned aerial vehicle may, but not limited to, complete the target flight tasks based on the electric capacity consumed by the unmanned aerial vehicle to land safely and the existing electric capacity stored by the unmanned aerial vehicle. For example, the electric capacity of the unmanned aerial vehicle to execute the flight tasks is calculated by subtracting the reserved electric capacity that may, but not limited to, be used by the unmanned aerial vehicle in the event of an accident from the existing electric capacity stored by the unmanned aerial vehicle. When the electric capacity of the unmanned aerial vehicle used to execute the flight tasks is greater than or equal to an electric capacity required by the unmanned aerial vehicle to perform the target flight tasks, the unmanned aerial vehicle is predicted to be able to complete the target flight tasks. Alternatively, when the electric capacity of the unmanned aerial vehicle used to execute the flight tasks is less than the electric capacity required by the unmanned aerial vehicle to perform the target flight tasks, the unmanned aerial vehicle is predicted to be unable to complete the target flight task, and control the unmanned aerial vehicle to acquire the target control request sent by the controller.

In the technical solution provided by the above step S204, the current energy consumption data of the unmanned aerial vehicle may, but not limited to, be determined by detecting an electric capacity of each battery installed on the unmanned aerial vehicle.

Optionally, in the present embodiment, the current energy consumption data of the unmanned aerial vehicle may include, but not limited to, total energy of the batteries installed on the unmanned aerial vehicle, energy used to ensure safe landing of the unmanned aerial vehicle in the total energy of the batteries of the unmanned aerial vehicle, and an energy consumption power of the unmanned aerial vehicle to consume energy.

Optionally, in the present embodiment, the energy used by the unmanned aerial vehicle in the event of an accident in the total energy of the batteries of the unmanned aerial vehicle may, but not limited to, be determined according to landing parameters of the unmanned aerial vehicle by acquiring the total energy of the batteries installed on the unmanned aerial vehicle. The current energy consumption data of the unmanned aerial vehicle may be then determined according to energy consumption power to consume energy while executing the flight task.

In an exemplary embodiment, the current energy consumption data of the unmanned aerial vehicle may, but not limited to, be detected in the following manners: calculating an actual remaining electric capacity of the unmanned aerial vehicle according to a total electric capacity, a remaining electric capacity percentage and a reserved electric capacity of the unmanned aerial vehicle to obtain remaining energy, the remaining electric capacity percentage being displayed on a control interface of the unmanned aerial vehicle, the reserved electric capacity being an electric capacity reserved by the unmanned aerial vehicle, and the remaining energy being configured to indicate a current electric capacity of the unmanned aerial vehicle; calculating energy consumed by the unmanned aerial vehicle to land by adopting a fixed-wing mode to obtain a landing energy consumption; calculating a product of a discharge current and a discharge voltage of a battery on the unmanned aerial vehicle to obtain an energy consumption power, the energy consumption power being configured to indicate a current electricity consumption power of the unmanned aerial vehicle; and determining the remaining energy, the landing energy consumption and the energy consumption power as the current energy consumption data.

Optionally, in the present embodiment, the unmanned aerial vehicle may, but not limited to, be installed with one or more battery devices for supplying power to the unmanned aerial vehicle, and the electric energy of the battery devices may, but not limited to, be predetermined before the battery devices leave the factory.

Optionally, in the present embodiment, a total electric capacity of the unmanned aerial vehicle may be, but not limited to, a sum of the energy of all battery devices installed on the unmanned aerial vehicle. For example: by taking two battery device of the same specification being installed on the unmanned aerial vehicle as an example, it is set that the energy of each battery device is E_Battery_Wh. In a unit "Wh (watt-hour)", the electric energy E_total of the unmanned aerial vehicle is equal to a sum of the energy of the two batteries, $E\_total=E\_Battery\_Wh\times3600\times2$.

Optionally, in the present embodiment, an embodiment of energy of a battery device is provided. Table 1 is an example of the energy of a battery device according to an embodiment of the present application. As shown in Table 1, the battery device installed on the unmanned aerial vehicle may, but not limited to, be selected according to a model of the unmanned aerial vehicle, thereby determining single-battery electric energy of the battery device. For example: when the model of the unmanned aerial vehicle is 5 kg (the weight of the unmanned aerial vehicle may be, but not limited to, 5 kg), it may be considered that the energy of a single battery device installed on the unmanned aerial vehicle may be, but not limited to, 174 Wh; when the model of the unmanned aerial vehicle is 7 kg (the weight of the unmanned aerial vehicle may be, but not limited to, 7 kg), it may be considered that the energy of a single battery deployed on the unmanned aerial vehicle may be, but not limited to, 277.2 Wh; and when the model of the unmanned aerial vehicle is 15 kg (the weight of the unmanned aerial vehicle may be, but not limited to, 15 kg), it may be considered that the energy of a single battery deployed on the unmanned aerial vehicle may be, but not limited to, 822.36 Wh, etc.

TABLE 1

| Weight | 5 kg | 7 kg | 15 kg |
|---|---|---|---|
| Single-battery electric energy Wh | 174 Wh | 277.2 Wh | 822.36 Wh |

Figure 3:
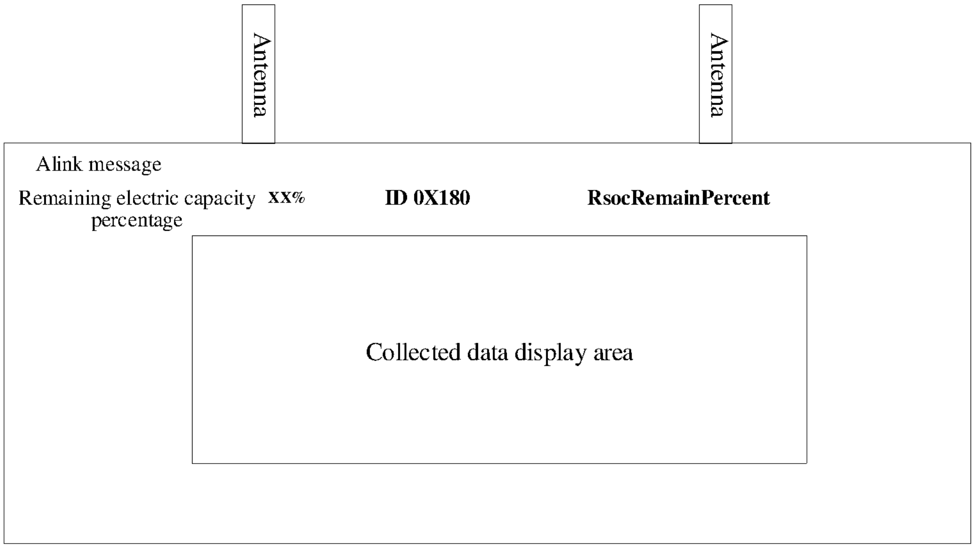
FIG. 3 is a schematic diagram of a control interface of the unmanned aerial vehicle according to an embodiment of the present application.

Optionally, in the present embodiment, FIG. 3 is a schematic diagram of a control interface of an unmanned aerial vehicle according to an embodiment of the present application. As shown in FIG. 3, the remaining electric capacity percentage of the unmanned aerial vehicle may be, but not limited to, data that is updated on the control interface of the unmanned aerial vehicle in real time. For example: the control interface of the unmanned aerial vehicle may, but not limited to, display an Alink message. ID 0X180 may, but not limited to, be used to represent the battery information of the battery device deployed on the unmanned aerial vehicle, or member RsocRemainPercent in the battery information may, but not limited to, be used to represent a remaining electric capacity percentage of the unmanned aerial vehicle, in %.

Optionally, in the present embodiment, it is possible, part of the total electric capacity of the unmanned aerial vehicle may, but not limited to, be used as the reserved electric capacity reserved by the unmanned aerial vehicle. The reserved electric capacity may be, but not limited to, an electric capacity that is not shown in the remaining electric capacity percentage of the unmanned aerial vehicle. For example: if the remaining electric capacity percentage of the unmanned aerial vehicle shows 0%, 10% of guaranteed electric capacity may also be, but not limited to, be used as a reserved electric capacity. That is, 90% of true total energy E_total of the unmanned aerial vehicle may, but not limited to, be used as false total energy of the unmanned aerial vehicle, and then the remaining electric capacity percentage is calculated.

Optionally, in the present embodiment, the actual remaining electric capacity of the unmanned aerial vehicle may be, but not limited to, a sum of the false remaining electric capacity indicated by the remaining electric capacity percentage of the unmanned aerial vehicle and the reserved electric capacity of the unmanned aerial vehicle.

Optionally, in the present embodiment, an embodiment of a remaining energy calculation method of an unmanned aerial vehicle is provided. Taking the remaining electric capacity percentage RsocRemainPercent of the unmanned aerial vehicle being 70% and 90% of the true total energy E_total of the unmanned aerial vehicle being the false total energy of the unmanned aerial vehicle as examples, actual remaining available energy (i.e., remaining energy) of the unmanned aerial vehicle is $E\_available=E\_total\times0.9\times(70\div100)$.

Optionally, in the present embodiment, landing methods of the unmanned aerial vehicle may include, but not limited to, circling descent to landing in a fixed-wing mode. For example: the whole landing process of the unmanned aerial vehicle may be circling descent in the fixed-wing mode until landing by using fixed parameters, or circling descent in the fixed-wing mode until landing by using parameters that are self-adaptively adjusted in stages.

Optionally, in the present embodiment, the landing energy consumption of the unmanned aerial vehicle may be, but not limited to, the total energy consumed by the unmanned aerial vehicle from the beginning of the descent to landing. For example: taking circling descent to landing of the unmanned aerial vehicle in the fixed-wing mode as an example, the landing energy consumption of the unmanned aerial vehicle may include, but not limited to, the landing energy consumption for circling descent to landing in the fixed-wing mode.

Optionally, in the present embodiment, an embodiment in which a landing energy consumption of the unmanned aerial vehicle is calculated is provided. Taking the calculation of energy consumed by the unmanned aerial vehicle in a fixed-wing descent stage (i.e., in a process of circling descent by using the fixed-wing mode) as an example, the energy consumed by the unmanned aerial vehicle in the fixed-wing descent stage (i.e., in the process of circling descent by using the fixed-wing mode) may be, but not limited to, a time consumed by the unmanned aerial vehicle in the fixed-wing descent stage multiplied by a power of the unmanned aerial vehicle to descend; and a time consumed in the fixed-wing descent stage may, but not limited to, be equal to an height of the unmanned aerial vehicle to descend divided by a speed of the unmanned aerial vehicle. For example, the energy consumed in the fixed-wing descent phase (i.e., circling descent in the fixed-wing mode) is E_cost_fw; an height of the fixed-wing descent stage is H_fw; a speed of the fixed-wing descent stage is zv_fw; a power of the fixed-wing descent stage is P_fw; and the energy consumed in the fixed-wing descent stage may be, but not limited to, $E\_cost\_fw=(H\_fw\div zv\_fw)\times P\_fw$.

Optionally, in the present embodiment, the energy consumption power of the unmanned aerial vehicle may, but not limited to, be associated with a specification of the unmanned aerial vehicle, and an energy consumption speed (i.e., energy consumption power) of a plurality of specifications of the unmanned aerial vehicles may be obtained according to previous flight logs of the unmanned aerial vehicles.

Optionally, in the present embodiment, an embodiment of an energy consumption power of an unmanned aerial vehicle is provided. Table 2 is an example of an energy consumption power of an unmanned aerial vehicle in an embodiment of the present application. As shown in Table 2, different models of unmanned aerial vehicles may, but not limited to, have corresponding energy consumption powers by using different descent methods. For example, an unmanned aerial vehicle having a model of 5 kg has an energy consumption power that may be, but not limited to, 90 W in a circling descent process using a fixed-wing mode; an unmanned aerial vehicle having a model of 7 kg has an energy consumption power that may be, but not limited to, 160 W in a circling descent process using a fixed-wing mode; and an unmanned aerial vehicle having a model of 15 kg has an energy consumption power that may be, but not limited to, 60 W in a circling descent process using a fixed-wing mode.

TABLE 2

| | Circling descent P__fw in fixed-wing mode |
|---|---|
| 5 kg | 90 W |
| 7 kg | 160 W |
| 15 kg | 60 W |

Optionally, in the present embodiment, a landing speed of the unmanned aerial vehicle in the descent stage may, but not limited to, be predetermined according to performances of the unmanned aerial vehicle. The landing speed of the unmanned aerial vehicle in the descent stage may, but not limited to, be acquired from performance parameters of the unmanned aerial vehicle. For example: taking the landing speed FMS_MANUAL_Z_V in the circling descent process of the unmanned aerial vehicle using the fixed-wing mode being acquired from the performance parameters of the unmanned aerial vehicle as example, the landing speed in the circling descent process in the fixed-wing mode may be, but not limited to, 2 m/s to 4 m/s.

Figure 4:
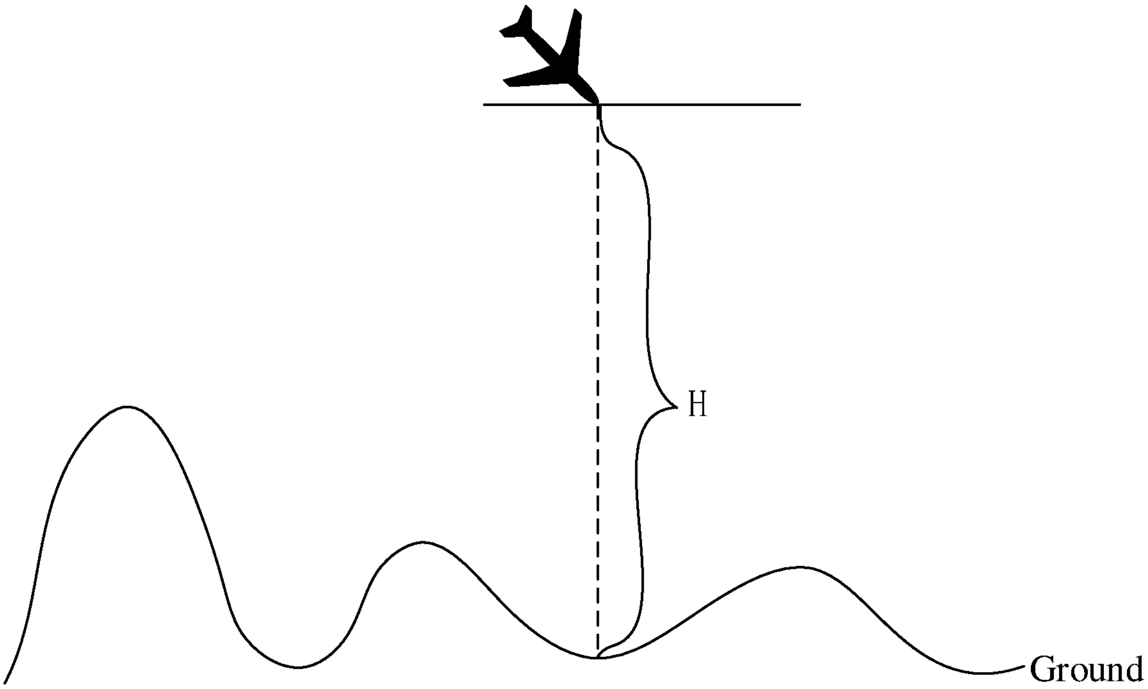
FIG. 4 is a schematic diagram of a descent height of the unmanned aerial vehicle according to an embodiment of the present application.

Optionally, in the present embodiment, an embodiment of determining a descent height of an unmanned aerial vehicle by using a method of circling descent of the unmanned aerial vehicle in a fixed-wing mode is provided. FIG. 4 is a schematic diagram of a descent height of an unmanned aerial vehicle in an embodiment of the present application. As shown in FIG. 4, taking a height H of the unmanned aerial vehicle from the ground being 100 meters as an example, the descent height H_fw of the unmanned aerial vehicle may, but not limited to, be equal to a vertical distance H of the unmanned aerial vehicle from the ground.

Optionally, in the present embodiment, an embodiment of calculating a landing energy consumption of an unmanned aerial vehicle is provided. Taking circling descent to landing of the unmanned aerial vehicle in a fixed-wing mode using fixed parameters as an example, the landing energy consumption E_land of the unmanned aerial vehicle may be, but not limited to, a landing energy consumption E_cost_fw of the unmanned aerial vehicle in the circling descent process using the fixed-wing mode.

Optionally, in the present embodiment, a discharge current of the battery device installed on the unmanned aerial vehicle may, but not limited to, be obtained from specification information of the battery device installed on the unmanned aerial vehicle. For example: a control interface of the unmanned aerial vehicle may, but not limited to, display an Alink message, wherein ID 0X180 represents the specification information of the battery device installed on the unmanned aerial vehicle. A member Current in the specification information of the battery may, but not limited to, be used to represent the discharge current of the unmanned aerial vehicle. A unit of the discharge current may be, but not limited to, mA (milliampere). When an electricity consumption power of the unmanned aerial vehicle is calculated based on the discharge current, the unit of the discharge current may, but not limited to, be converted into to A (amps).

Optionally, in the present embodiment, the discharge current of the battery device installed on the unmanned aerial vehicle may, but not limited to, be displayed on the control interface of the unmanned aerial vehicle in the form of a negative number. When the electricity consumption power of the unmanned aerial vehicle is calculated based on the discharge current, the electricity consumption power of the unmanned aerial vehicle may, but not limited to, be calculated by acquiring an absolute value of the discharge current of the unmanned aerial vehicle.

Optionally, in the present embodiment, a discharge voltage of the battery device installed on the unmanned aerial vehicle may, but not limited to, be obtained from specification information of the battery device installed on the unmanned aerial vehicle. For example: a control interface of the unmanned aerial vehicle may, but not limited to, display an Alink message, wherein ID 0X180 represents the specification information of the battery device deployed on the unmanned aerial vehicle. A member Voltage in the specification information of the battery device may, but not limited to, be used to represent the discharge voltage of the unmanned aerial vehicle, having a unit of mV (millivolt). When the electricity consumption power of the unmanned aerial vehicle is calculated based on the discharge voltage, the unit of the discharge voltage may, but not limited to, be converted into to V (volt).

Optionally, in the present embodiment, a current electricity consumption power of the unmanned aerial vehicle may, but not limited to, be calculated according to the discharge current and the discharge voltage of the battery installed on the unmanned aerial vehicle at the current moment. For example, an energy consumption power P_cost=I×U may, but not limited to, be acquired by calculating a product U of the discharge current I and the discharge voltage of the battery on the unmanned aerial vehicle.

Optionally, in the present embodiment, the current energy consumption data may, but not limited to, be used to indicate energy consumed by the unmanned aerial vehicle in the process of performing a flight task.

In the technical solution provided by the step S206, the current ground speed of the unmanned aerial vehicle may be, but not limited to, a flight speed of the unmanned aerial vehicle relative to the ground. The ground speed of the unmanned aerial vehicle may, but not limited to be selected by filtering the flight speed of the unmanned aerial vehicle relative to the ground.

Optionally, in the present embodiment, the remaining navigation parameters of the unmanned aerial vehicle may include, but not limited to, a time that the unmanned aerial vehicle can fly when performing a flight task at the current energy, a flight distance in the process of performing a flight task at the current energy, and the like.

In an exemplary embodiment, the remaining navigation parameters may be calculated according to the current energy consumption data and the current ground speed of the unmanned aerial vehicle by using the following manners, including but not limited to: determining a remaining flight time of the unmanned aerial vehicle according to the current energy consumption data, the remaining flight time being configured to indicate a time of the unmanned aerial vehicle permitted to continue flying while landing safely under a scenario of the current energy consumption data; determining a product of the remaining flight time and the current ground speed as a remaining flight range of the unmanned aerial vehicle; and determining the remaining flight time and the remaining flight range as the remaining navigation parameters.

Optionally, in the present embodiment, the remaining flight time of the unmanned aerial vehicle may, but not limited to, be calculated according to the energy consumption power of the unmanned aerial vehicle and the current energy consumption data of the unmanned aerial vehicle. For example: the remaining flight time of the unmanned aerial vehicle may, but not limited to, be obtained by dividing the actual current energy consumption data of the unmanned aerial vehicle by the energy consumption power of the unmanned aerial vehicle.

Optionally, in the present embodiment, the current ground speed of the unmanned aerial vehicle may be, but not limited to, a flight speed of the unmanned aerial vehicle relative to the ground in the process of performing a flight task.

Optionally, in the present embodiment, extreme data in the ground speeds of the unmanned aerial vehicle may, but not limited to, be rejected by filtering the current ground speed of the unmanned aerial vehicle. For example, the ground speed of the unmanned aerial vehicle may, but not limited to, be filtered by using a formula xi=K×(yi−xi−1)× dt+xi−1, wherein xi represents a result obtained by filtering a current beat; K represents a filtering coefficient of the filtering, and the smaller K means the more ground speeds being filtered off by filtering the ground speeds of the unmanned aerial vehicle; the current ground speeds of the unmanned aerial vehicle may, but not limited to, be filtered; an initial value of the filtering coefficient may be, but not limited to, 1, followed by actual measurements for parameter adjustment; yi represents an unfiltered ground speed received at the current beat; xi−1 represents a filtering result of the previous beat; and dt represents a time interval between two beats.

Table 3 is an example in which ground speeds of an unmanned aerial vehicle are filtered according to an embodiment of the present application. As shown in Table 3, the ground speeds of the unmanned aerial vehicle at 1 s and 2 s are filtered by the following manners including, but not limited to: taking the ground speed of the unmanned aerial vehicle at an initial moment $x_{i-1}$ being 20 m/s as an example, a filtering coefficient is K (an initial value is 1); taking the ground speed of the unmanned aerial vehicle 1 s before filtering being 21 m/s as an example, the filtered ground speed may be, but not limited to, x1=K×(21−20)×dt+20, and since the initial value of K is 1, ×1=20.5 m/s; and taking the ground speed of the unmanned aerial vehicle 2 s before filtering being 19 m/s as an example, the filtered ground speed may be, but not limited to, x2=K×(19−20.5)×dt+20.5, and since K needs to be actually measured (may be, but not limited to, 1) for parameter adjustment, ×2=20.5 K (m/s).

TABLE 3

| | 0 s | 1 s | 2 s |
|---|---|---|---|
| Before filtering | — | 21 | 19 |
| After filtering | 20 | K × (21 − 20) × dt + 20 | K × (19 − 20.5) × dt + 20.5 |

Optionally, in the present embodiment, a remaining flight range of the unmanned aerial vehicle may be, but not limited to, a product of the remaining flight time of the unmanned aerial vehicle in the process of performing a flight task and the speed of the unmanned aerial vehicle relative to the ground. For example: taking the flight speed (current ground speed) v_ground of the unmanned aerial vehicle relative to the ground and the remaining flight time time_remian of the unmanned aerial vehicle as an example, the remaining flight range length_remain may, but not limited to, be equal to length_remain=time_remian×v_ground.

In an exemplary embodiment, the remaining flight time unmanned aerial vehicle may be determined according to the current energy consumption data using the following manners, including, but not limited to: determining a difference between remaining energy and a landing energy consumption as remaining flight energy, the remaining energy being configured to indicate a current electric capacity of the unmanned aerial vehicle, and the landing energy consumption being configured to indicate energy consumed by the unmanned aerial vehicle to land; and determining a ratio of the remaining flight energy to an energy consumption power as the remaining flight time, the energy consumption power being configured to indicate a current electricity consumption power of the unmanned aerial vehicle, and the current energy consumption data including the remaining energy, the landing energy consumption and the energy consumption power.

Optionally, in the present embodiment, the remaining energy of the unmanned aerial vehicle may be, but not limited to, a sum of a false remaining electric capacity indicated by the remaining electric capacity percentage of the unmanned aerial vehicle and a reserved electric capacity of the unmanned aerial vehicle.

Optionally, in the present embodiment, the landing energy consumption of the unmanned aerial vehicle may be, but not limited to, a landing energy consumption of the unmanned aerial vehicle for circling descent in a fixed-wing mode.

Optionally, in the present embodiment, the remaining flight energy of the unmanned aerial vehicle may include, but not limited to, a difference between an actual remaining electric capacity of the unmanned aerial vehicle and energy required by the unmanned aerial vehicle to land. For example, the remaining flight energy of the unmanned aerial vehicle may be, but not limited to, a value obtained by subtracting the landing energy consumption of the unmanned aerial vehicle for circling descent in the fixed-wing mode from the remaining energy of the unmanned aerial vehicle.

Optionally, in the present embodiment, the energy consumption power of the unmanned aerial vehicle may, but not limited to, be calculated according to a product of a current discharged by a battery deployed on the unmanned aerial vehicle and a discharge voltage.

Optionally, in the present embodiment, the remaining flight time of the unmanned aerial vehicle may, but not limited to, be calculated according to the remaining flight time of the unmanned aerial vehicle and the energy consumption power. For example, taking the remaining energy E_available, landing consumption E_land, and energy consumption power P_cost as an example, the remaining flight energy may be, but not limited to, (remaining energy E_available−landing consumption E_land), and the remaining flight time may be, but not limited to, time remain=(E_available−E_land)÷P_cost.

Optionally, in the present embodiment, the current energy consumption data and the current ground speed of the unmanned aerial vehicle may, but not limited to, be updated every once in a while (update frequency); and low-pass filtering may, but not limited to, be performed on the current energy consumption data and the current ground speed of the unmanned aerial vehicle during this period of time, so as to avoid frequent jumps in the remaining flight range caused by data noise.

In an exemplary embodiment, an embodiment of a default energy consumption power and a default ground speed of an unmanned aerial vehicle in a fixed-wing mode is provided. Table 4 is an example of a default energy consumption power and a default ground speed of an unmanned aerial vehicle in a fixed-wing mode according to an embodiment of the present application. As shown in Table 4, the default energy consumption power and the default ground speed of the unmanned aerial vehicle during circling descent in a fixed-wing mode may, but not limited to, be determined according to a model of the unmanned aerial vehicle. When the model of the unmanned aerial vehicle is 5 kg, the default energy consumption power of the unmanned aerial vehicle is 300 W, and the default ground speed of the unmanned aerial vehicle is 20 m/s; when the model of the unmanned aerial vehicle is 7 kg, the default energy consumption power of the unmanned aerial vehicle is 300 W, and the default ground speed of the unmanned aerial vehicle is 20 m/s; and when the model of the unmanned aerial vehicle is 15 kg, the default energy consumption power of the unmanned aerial vehicle is 500 W, and the default ground speed of the unmanned aerial vehicle is 20 m/s.

TABLE 4

| | 5 kg | 7 kg | 15 kg |
|---|---|---|---|
| Default power | 300 W | 300 W | 500 W |
| Default ground speed | 20 m/s | 20 m/s | 20 m/s |

Optionally, in an exemplary embodiment, extreme data may be, but not limited to be, rejected by limiting the energy consumption power of the unmanned aerial vehicle. Table 5 is an example in which an energy consumption power of an unmanned aerial vehicle is limited according to an embodiment of the present application. As shown in Table 5, the energy consumption power of the unmanned aerial vehicle may, but not limited to, be limited according to a model of the unmanned aerial vehicle. When the model of the unmanned aerial vehicle is 5 kg, an energy consumption power of the unmanned aerial vehicle in a descent stage is 300 W, an energy consumption power of the unmanned aerial vehicle in a level flight stage is 300 W, and an energy consumption power of the unmanned aerial vehicle in a climbing stage is 630 W; when the model of the unmanned aerial vehicle is 7 kg, an energy consumption power of the unmanned aerial vehicle in a descent stage is 160 W, an energy consumption power of the unmanned aerial vehicle in a level flight stage is 300 W, and an energy consumption power of the unmanned aerial vehicle in a climbing stage is 760 W; and when the model of the unmanned aerial vehicle is 15 kg, an energy consumption power of the unmanned aerial vehicle in a descent stage is 60 W, an energy consumption power of the unmanned aerial vehicle in a level flight stage is 500 W, and an energy consumption power of the unmanned aerial vehicle in a climbing stage is 1700 W.

TABLE 5

| | Descent power (lower limit) | Level flight power (default) | Climbing power (upper limit) |
|---|---|---|---|
| 5 kg | 90 W | 300 W | 630 W |
| 7 kg | 160 W | 300 W | 760 W |
| 15 kg | 60 W | 500 W | 1700 W |

Optionally, in the present embodiment, extreme data may, but not limited to, be rejected by limiting a ground speed of the unmanned aerial vehicle. Table 6 is an example in which the ground speed of the unmanned aerial vehicle is limited according to an embodiment of the present application. As shown in Table 6, it may, but not limited to, be set that a lower limit of the ground speed of the unmanned aerial vehicle is 13 m/s, a level flight speed of the unmanned aerial vehicle is 20 m/s, and an upper limit of the unmanned aerial vehicle is 30 m/s. That is, the flight speed of the unmanned aerial vehicle relative to the ground is always greater than or equal to 13 m/s and less than or equal to 30 m/s in the process of performing a flight task.

TABLE 6

| | Lower limit of ground speed | Ground speed (default) in level flight | Upper limit of ground speed |
|---|---|---|---|
| 5 kg | 13 m/s | 20 m/s | 30 m/s |
| 7 kg | 13 m/s | 20 m/s | 30 m/s |
| 15 kg | 13 m/s | 20 m/s | 30 m/s |

Optionally, in the present embodiment, extreme data may, but not limited to, be rejected by limiting the remaining flight time of the unmanned aerial vehicle. Table 7 is an example in which the remaining flight time of the unmanned aerial vehicle is limited according to an embodiment of the present application. As shown in Table 7, the remaining flight time (i.e., a navigation time) of the unmanned aerial vehicle may, but not limited to, be limited according to a model of the unmanned aerial vehicle. When the model of the unmanned aerial vehicle is 5 Kg, an upper limit of the remaining flight time of the manned aerial vehicle may be, but not limited to, 60 min, and the remaining flight time of greater than 60 min, which is calculated according to the remaining flight energy and the energy consumption power of the unmanned machine, may, but not limited to, be rejected; when the model of the unmanned aerial vehicle is 7 kg, an upper limit of the remaining flight time of the unmanned aerial vehicle may be, but not limited to, 90 min, and the remaining flight time of greater than 90 min, which is calculated according to the remaining flight energy of the unmanned aerial vehicle and the energy consumption power, may, but not limited to, be rejected; and when the model of the unmanned aerial vehicle is 15 kg, an upper limit of the remaining flight time of the unmanned aerial vehicle may be, but not limited to, 130 min, and the remaining flight time of greater than 130 min, which is calculated according to the remaining flight energy of the unmanned aerial vehicle and the energy consumption power, may, but not limited to, be rejected.

TABLE 7

| | 5 kg | 7 kg | 15 kg |
|---|---|---|---|
| Upper limit of flight time | 60 min = 3600 s | 90 min = 5400 s | 130 min = 7800 s |

In the technical solution provided by the step S208, the remaining navigation parameters of the unmanned aerial vehicle may, but not limited to, be used to indicate a distance that the unmanned aerial vehicle can fly on the premise of landing safely; and remaining flight tasks of the unmanned aerial vehicle may, but not limited to, be determined according to the remaining navigation parameters of the unmanned aerial vehicle.

Optionally, in the present embodiment, the unmanned aerial vehicle may, but not limited to, plan a plurality of target flight tasks in advance; and the flight tasks of the unmanned aerial vehicle may, but not limited to, be adjusted in real time according to a distance that the unmanned aerial vehicle can fly, and determine the remaining flight tasks of the unmanned aerial vehicle.

Optionally, in the present embodiment, the remaining flight tasks of the unmanned aerial vehicle may, but not limited to, be determined from the target flight tasks; and the remaining flight tasks of the unmanned aerial vehicle may, but not limited to, be that the unmanned aerial vehicle determines the flight tasks that need to be executed by the unmanned aerial vehicle after the remaining navigation parameters are determined.

In an exemplary embodiment, the unmanned aerial vehicle is controlled to execute the remaining flight tasks in the target flight tasks according to the remaining navigation parameters using the following manners including, but not limited to: displaying prompt information on a control interface of the unmanned aerial vehicle, the prompt information being configured to prompt the current remaining navigation parameters of the unmanned aerial vehicle, and a flight scope permitted by using the remaining navigation parameters; receiving a control instruction triggered on the control interface in response to the prompt information; and controlling the unmanned aerial vehicle to execute the remaining flight tasks in the target flight tasks according to the control instruction.

Optionally, in the present embodiment, the control interface of the unmanned aerial vehicle may be, but not limited to, a display interface of a control terminal of the unmanned aerial vehicle. The user may, but not limited to, acquire a flight state of the unmanned aerial vehicle in real time through the control interface.

Optionally, in the present embodiment, the remaining flight time and the remaining flight range of the unmanned aerial vehicle may, but not limited to, be displayed on the control interface of the unmanned aerial vehicle; and the flight scope of the unmanned aerial vehicle may, but not limited to, be planned according to the remaining flight time and the remaining flight range of the unmanned aerial vehicle.

Optionally, in the present embodiment, the user may, but not limited to, issue a control instruction to the unmanned aerial vehicle through the control interface; and the control interface may, but not limited to, convert instructions of a user into instructions that can be identified by the unmanned aerial vehicle and control the unmanned aerial vehicle to perform the control instruction.

Optionally, in the present embodiment, the remaining flight tasks in the target flight tasks may, but not limited to, include all target flight tasks or part of the target flight tasks. For example: when the unmanned aerial vehicle has not begun to execute the target flight tasks, the unmanned aerial vehicle begins to execute the target flight tasks by acquiring the control instruction, and the remaining flight tasks at this time are the target flight tasks. Alternatively, when the unmanned aerial vehicle executes the target flight tasks, the unmanned aerial vehicle completes part of the target flight tasks that have not been completed yet according to a requirement of the control instruction, and the uncompleted parts at this time are the remaining flight tasks.

In an exemplary embodiment, the unmanned aerial vehicle may be controlled to execute the remaining flight tasks in the target flight tasks according to the remaining navigation parameters in the following manners including, but not limited to: extracting the remaining flight tasks from the target flight tasks; screening reference flight tasks permitted to be reached by the remaining navigation parameters from the remaining flight tasks according to a priority of each task in the remaining flight tasks; and controlling the unmanned aerial vehicle to land after executing the reference flight tasks.

Optionally, in the present embodiment, the remaining flight tasks may be, but not limited to, part of the target flight tasks.

Optionally, in the present embodiment, the priority of the above tasks may, but not limited to, be predetermined while issuing the tasks to the unmanned aerial vehicle. Alternatively, the priority of the above tasks may, but not limited to, be changed in real time according to instructions from the control terminal.

Optionally, in the present embodiment, reference flight tasks that are permitted to be reached by the remaining navigation parameters may, but not limited to, include one or more of the followings, for example: the unmanned aerial vehicle may, but not limited to, have different remaining flight tasks having a plurality of priorities; when the remaining navigation parameters of the unmanned aerial vehicle are acquired, the remaining navigation parameters may be, but not limited to, a flight task indicating a flight task having a longest distance that can be executed by the unmanned aerial vehicle while landing safely; the remaining flight tasks that can be executed by the unmanned aerial vehicle may, but not limited to, be determined from the remaining flight tasks of the unmanned aerial vehicle according to the remaining navigation parameters of the unmanned aerial vehicle; and then, a task having the highest priority is acquired as the reference flight task according to the priorities of the tasks, and the reference flight task is executed.

Figure 5:
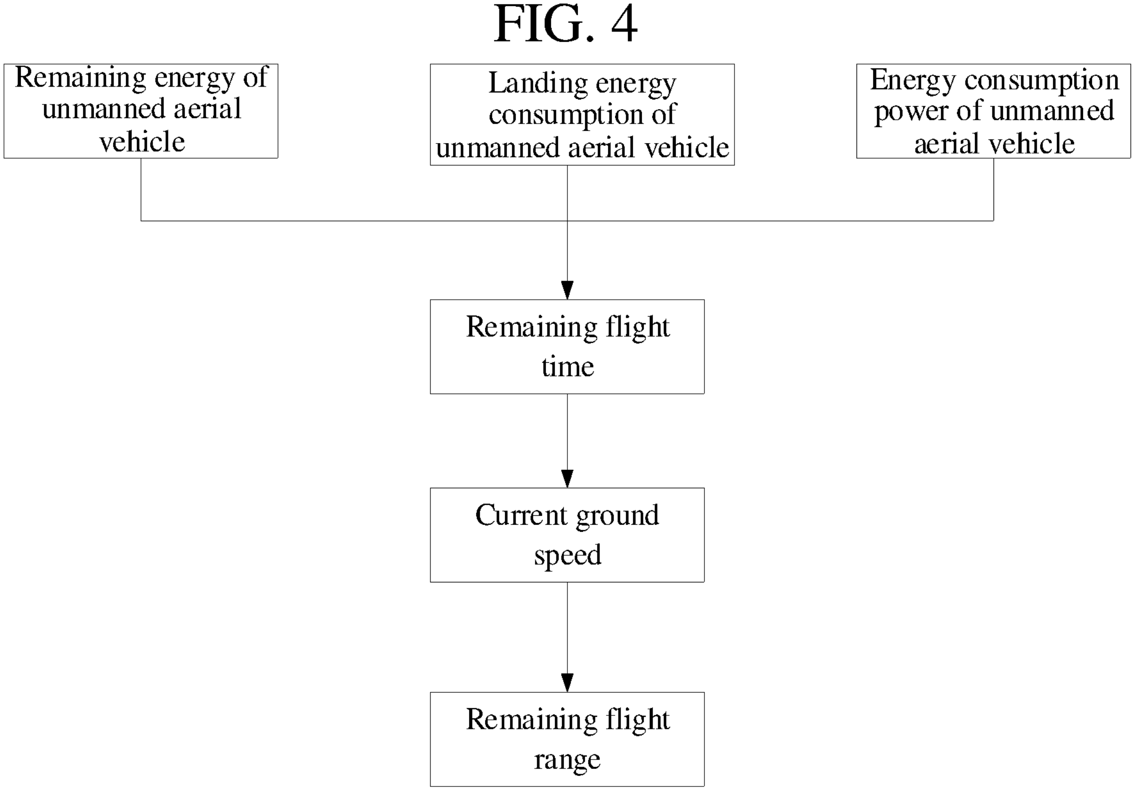
FIG. 5 is a flow chart of a process of calculating remaining navigation parameters of the unmanned aerial vehicle according to an embodiment of the present application.

In an exemplary embodiment, an example in which remaining navigation parameters of an unmanned aerial vehicle are calculated is provided. FIG. 5 is a flow chart of a process of calculating the remaining navigation parameters of the unmanned aerial vehicle according to an embodiment of the present application. As shown in FIG. 5, the remaining navigation parameters of the unmanned aerial vehicle may, but not limited to, be calculated through the following steps:

calculating remaining energy of the unmanned aerial vehicle, and calculating a current electric capacity (remaining energy E_available) of the unmanned aerial vehicle according to the total electric capacity E_total of the batteries installed on the unmanned aerial vehicle, the remaining electric capacity percentage (may include, but not limited to, a remaining electric capacity percentage that is calculated by taking a part of total energy as false total energy of the unmanned aerial vehicle) displayed on the control interface of the unmanned aerial vehicle and the reserved electric capacity of the unmanned aerial vehicle, wherein the current electric capacity may be, but not limited to: E_available=E_total×false total energy of the unmanned aerial vehicle×remaining electric capacity percentage.

Taking a method in which the unmanned aerial vehicle circles and descends from a height H to landing using a fixed-wing mode as an example, energy consumed by the unmanned aerial vehicle in the descent stage may be, but not limited to, energy E_cost_fw consumed by the unmanned aerial vehicle in the fixed-wing mode stage. The unmanned aerial vehicle whose descent power P_fw (may, but not limited to, be acquired from performance parameters of the unmanned aerial vehicle) may, but not limited to, be controlled to keep a speed zv_fw (may, but not limited to, be acquired from performance parameters of the unmanned aerial vehicle) in the fixed-wing mode stage to an height 100 meters away from the ground. Therefore, the height of the unmanned aerial vehicle in the fixed-wing mode stage may be, but not limited to H_fw=H. It may be seen that the energy consumed by the unmanned aerial vehicle in the fixed-wing model stage may be, but not limited to E_cost_fw=(H_fw÷zv_fw)×P_fw. Therefore, the landing energy consumption of the unmanned aerial vehicle using the fixed-wing mode in a manner of circling descent from a height H to landing is E_land=(H_fw÷zv_fw)×P_fw.

The energy consumption power of the unmanned aerial vehicle may, but not limited to, be calculated according to a discharge current and a discharge voltage of a battery installed on the unmanned aerial vehicle, for example, energy consumption power P_cost=discharge current I×discharge voltage U.

The remaining flight time time_remain=(E_available−E_land)÷P_cost of the unmanned aerial vehicle is calculated by acquiring the remaining energy E_available, the landing energy consumption E_land and the energy consumption power P_cost of the unmanned aerial vehicle. The current flight speed (i.e., the current ground speed) of the unmanned aerial vehicle relative to the ground is then acquired. The remaining flight range lenth_remain=time_remain×v_ground of the unmanned aerial vehicle is calculated according to the current ground speed v_ground.

Figure 6:
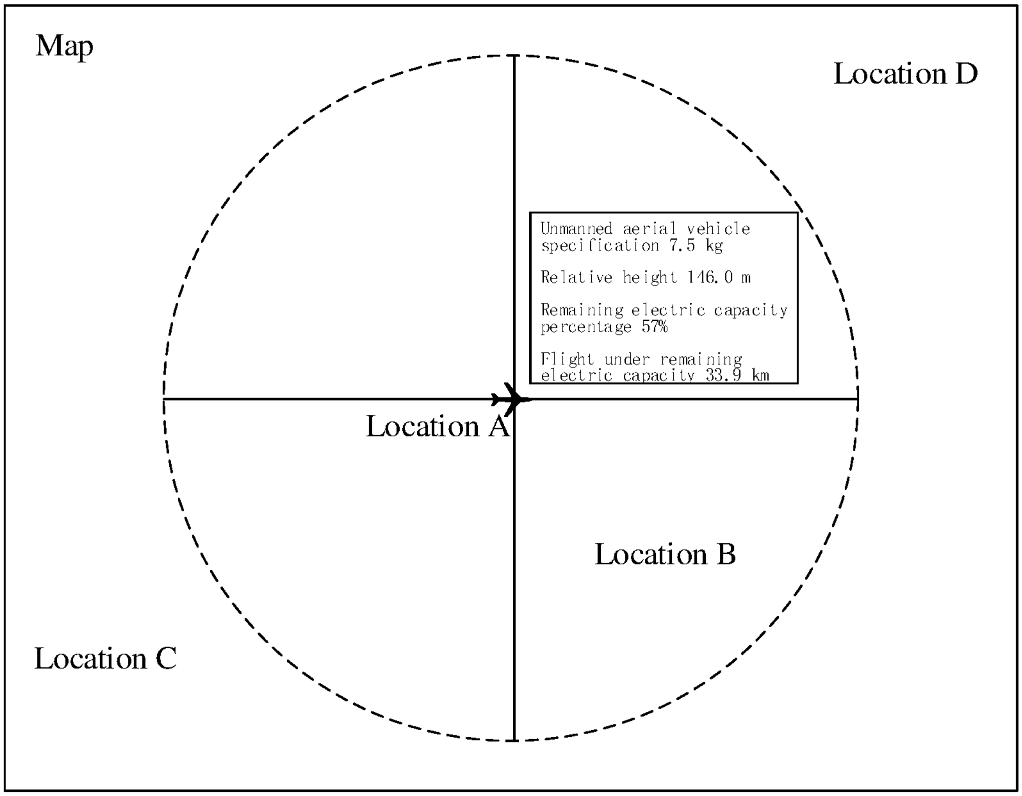
FIG. 6 is a schematic diagram of the remaining navigation parameters of the unmanned aerial vehicle according to an embodiment of the present application.

In an exemplary embodiment, an example of remaining navigation parameters of an unmanned aerial vehicle is provided. FIG. 6 is a schematic diagram of the remaining navigation parameters of the unmanned aerial vehicle according to an embodiment of the present application. As shown in FIG. 6, the remaining navigation parameters (may include, but not limited to, the remaining flight time of the unmanned aerial vehicle and the remaining flight range of the unmanned aerial vehicle) of the unmanned aerial vehicle may, but not limited to, be displayed through the control interface of the unmanned aerial vehicle. An image displayed on the control interface may include, but not limited to, real-time position information of the unmanned aerial vehicle in the process of executing a flight task, and a map around a position where the unmanned aerial vehicle is located.

Taking an image displayed on the control interface at a location A of the unmanned aerial vehicle that may include, but not limited to, maps at a position (location A) where the unmanned aerial vehicle is located, as well as locations B, C and D around the location A, a flight height of the unmanned aerial vehicle having a specification of 7.5 kg relative to the ground being 146.0 m and the remaining electric capacity percentage being 57% as examples, the remaining flight range of the unmanned aerial vehicle may, but not limited to, be calculated as 33.9 km. The control interface of the unmanned aerial vehicle may, but not limited to, display information: when the specification of the unmanned aerial vehicle is 7.5 kg, a flight height (relative height) of the unmanned aerial vehicle relative to the ground being 146.0 m; the remaining electric capacity percentage of the unmanned aerial vehicle being 57%; a remaining flight range (a flight range under the remaining electric capacity) of the unmanned aerial vehicle being 33.9 km, etc. A circle may, but not limited to, be drawn by taking the unmanned aerial vehicle in the image of the control interface as a circle center and taking the remaining flight range of the unmanned aerial vehicle as a radius. A position in the circle is a flight distance of the unmanned aerial vehicle that can ensure safe landing of the unmanned aerial vehicle. That is, it can be seen from the remaining navigation parameters of the unmanned aerial vehicle that the unmanned aerial vehicle may, but not limited to, execute flight tasks at the location B or other positions that fall within the circle.

Through the above description to the implementations, it can be clearly understood by a person skilled in the art that, the method according to the above embodiment may be implemented by software and necessary universal hardware platform, and of course may be implemented by hardware, but preferably by software and necessary universal hardware platform in many cases. Based on such understandings, the technical solutions of the present invention or the part thereof contributing to the prior art may be reflected in the form of a software product. The computer software product is stored in a storage medium (e.g., ROM/RAM, diskette, compact disk), and includes several instructions to cause a terminal device (which may be a mobile phone, a computer, a server or a network device, etc.) to perform the method according to each of the embodiments of the present invention.

This embodiment further provides a flight control apparatus for an unmanned aerial vehicle. The apparatus is configured to implement the above-mentioned embodiments and implementations, and those that have been explained will not be repeated. As used below, the term "module" may implement a combination of software and/or hardware with predetermined functions. Although the device described in the following embodiment is preferably implemented by software, hardware or a combination of software and hardware is also possible and conceived.

Figure 7:
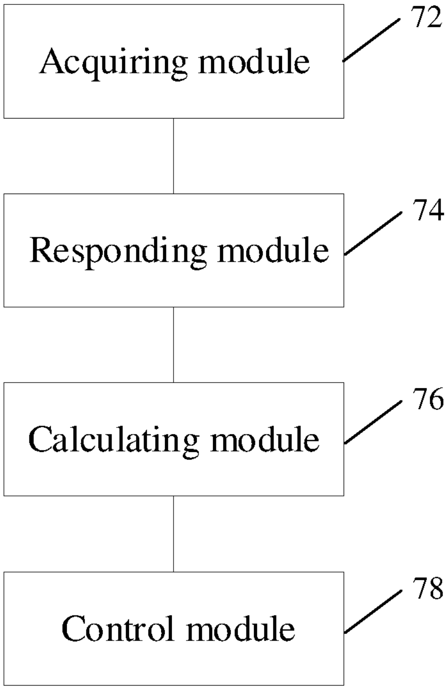
FIG. 7 is a structural block diagram of a flight control apparatus for the unmanned aerial vehicle according to an embodiment of the present invention.

FIG. 7 is a structural block diagram of a flight control apparatus for an unmanned aerial vehicle according to an embodiment of the present invention. As shown in FIG. 7, the apparatus includes:

- an acquiring module 72, configured to acquire a target control request of the unmanned aerial vehicle in a process of executing target flight tasks by the unmanned aerial vehicle, the target control request being configured to request flight control of the unmanned aerial vehicle;
- a responding module 74, configured to detect current energy consumption data of the unmanned aerial vehicle in response to the target control request, the current energy consumption data being configured to indicate a current energy consumption condition of the unmanned aerial vehicle;
- a calculating module 76, configured to calculate remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and
- a control module 78, configured to control the unmanned aerial vehicle to execute remaining flight tasks in the target flight tasks according to the remaining navigation parameters.

Through the above apparatus, in the process of performing the flight tasks, the unmanned aerial vehicle may estimate the remaining flight time to ensure that it can land safely according to the flight information such as the current energy consumption data and the ground speed, so as to re-plan an execution mode of the remaining flight tasks in the currently executed flight tasks according to the remaining flight time, that is, to ensure that the unmanned aerial vehicle can complete the execution of the remaining flight tasks within the existing electric capacity, and to ensure that the unmanned aerial vehicle can land safely. Therefore, the problem of low stability of the unmanned aerial vehicle in the process of executing the flight tasks can be solved, thereby achieving an effect of improving the stability of the unmanned aerial vehicle in the process of executing the flight tasks.

In an exemplary embodiment, the calculating module includes:

a first determining unit, configured to determine a remaining flight time of the unmanned aerial vehicle according to the current energy consumption data, the remaining flight time being configured to indicate a time of the unmanned aerial vehicle permitted to continue flying while landing safely under a scenario of the current energy consumption data;

a second determining unit, configured to determine a product of the remaining flight time and the current ground speed as a remaining flight range of the unmanned aerial vehicle; and a third determining unit, configured to determine the remaining flight time and the remaining flight range as the remaining navigation parameters.

In an exemplary embodiment, the first determining unit is configured to determine a difference between remaining energy and a landing energy consumption as remaining flight energy, the remaining energy being configured to indicate a current electric capacity of the unmanned aerial vehicle, and the landing energy consumption being configured to indicate energy consumed by the unmanned aerial vehicle to land; and determine a ratio of the remaining flight energy to an energy consumption power as the remaining flight time, the energy consumption power being configured to indicate a current electricity consumption power of the unmanned aerial vehicle, and the current energy consumption data including the remaining energy, the landing energy consumption and the energy consumption power.

In an exemplary embodiment, the control module includes:

a display unit, configured to display prompt information on a control interface of the unmanned aerial vehicle, the prompt information being configured to prompt the current remaining navigation parameters of the unmanned aerial vehicle and a flight range permitted by using the remaining navigation parameters;

a receiving unit, configured to receive a control instruction triggered on the control interface in response to the prompt information; and a first control unit, configured to control the unmanned aerial vehicle to execute the remaining flight tasks in the target flight tasks according to the control instruction.

In an exemplary embodiment, the control module includes:

an extracting unit, configured to extract the remaining flight tasks in the target flight tasks;

a screening unit, configured to screen reference flight tasks permitted to be reached by the remaining navigation parameters from the remaining flight tasks according to a priority of each task in the remaining flight tasks; and a second control unit, configured to control the unmanned aerial vehicle to land after executing the reference flight tasks.

In an exemplary embodiment, the detecting module includes:

a first calculating unit, configured to calculate an actual remaining electric capacity of the unmanned aerial vehicle according to a total electric capacity, a remaining electric capacity percentage and a reserved electric capacity of the unmanned aerial vehicle to obtain remaining energy, the remaining electric capacity percentage being displayed on the control interface of the unmanned aerial vehicle, the reserved electric capacity being an electric capacity reserved by the unmanned aerial vehicle, and the remaining energy being configured to indicate a current electric capacity of the unmanned aerial vehicle;

a second calculating unit, configured to calculate energy consumed by the unmanned aerial vehicle to land by adopting a fixed-wing mode to obtain a landing energy consumption;

a third calculating unit, configured to calculate a product of a discharge current and a discharge voltage of a battery on the unmanned aerial vehicle to obtain an energy consumption power, the energy consumption power being configured to indicate a current electricity consumption power of the unmanned aerial vehicle; and a fourth determining unit, configured to determine the remaining energy, the landing energy consumption and the energy consumption power as the current energy consumption data.

In the present embodiment, the acquiring module includes:

a receiving unit, configured to receive the target control request sent by the controller corresponding to the unmanned aerial vehicle; and a processing unit, configured to detect the remaining electric capacity of the unmanned aerial vehicle; predict whether the remaining electric capacity can complete the target flight task; and determine that the target control request is acquired in a case that the remaining electric capacity is predicted to be unable to complete the target flight task.

It should be noted that the above respective modules are implemented by software or hardware. When the above respective modules are implemented by hardware, they may be implemented by the following manners, including, but not limited to: all above modules being located in the same processor; or the various modules being located in different processors respectively in the form of any combination.

An embodiment of the present invention further provides a computer-readable storage medium. The computer-readable storage medium is configured to store a computer program therein, wherein the computer program is configured to, while in operation, perform the method described in any of the above method embodiments.

In the present embodiment, the computer-readable storage medium may be configured to store a computer program therein for performing the following steps:

S1, acquiring a target control request of the unmanned aerial vehicle in a process of executing target flight tasks by the unmanned aerial vehicle, the target control request being configured to request flight control of the unmanned aerial vehicle;

S2, detecting current energy consumption data of the unmanned aerial vehicle in response to the target control request, the current energy consumption data being configured to indicate a current energy consumption condition of the unmanned aerial vehicle;

S3, calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and S4, controlling the unmanned aerial vehicle to execute remaining flight tasks in the target flight tasks according to the remaining navigation parameters.

The computer-readable storage medium may be configured to store a computer program therein for performing the following steps:

S1, acquiring a target control request of the unmanned aerial vehicle in a process of executing target flight tasks by the unmanned aerial vehicle, the target control request being configured to request flight control of the unmanned aerial vehicle;

S2, detecting current energy consumption data of the unmanned aerial vehicle in response to the target control request, the current energy consumption data being configured to indicate a current energy consumption condition of the unmanned aerial vehicle;

S3, calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and S4, controlling the unmanned aerial vehicle to execute remaining flight tasks in the target flight tasks according to the remaining navigation parameters.

In an exemplary embodiment, the computer-readable storage medium may include, but not limited to: a U disk, a read-only memory (ROM), a random access memory (RAM), a mobile hard disk drive, a diskette, a compact disc or various media that can store computer programs.

An embodiment of the present invention further provides an electronic apparatus. The electronic apparatus includes a memory and a processor, wherein the memory is configured to store a computer program therein, and the processor is configured to operate the computer program so as to perform the steps in any of the above method embodiments.

In an exemplary embodiment, the electronic apparatus may further include a transmission device and an input/output device, wherein the transmission device is connected to the processor, and the input/output device is connected to the processor.

In an exemplary embodiment, the processor may be configured to perform the following steps through the computer programs:

S1, acquiring a target control request of the unmanned aerial vehicle in a process of executing target flight tasks by the unmanned aerial vehicle, the target control request being configured to request flight control of the unmanned aerial vehicle;

S2, detecting current energy consumption data of the unmanned aerial vehicle in response to the target control request, the current energy consumption data being configured to indicate a current energy consumption condition of the unmanned aerial vehicle;

S3, calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and S4, controlling the unmanned aerial vehicle to execute remaining flight tasks in the target flight tasks according to the remaining navigation parameters.

For specific examples in the present embodiment, reference may be made to the examples described in the above-mentioned embodiments and exemplary implementations, and details are not described herein again in the present embodiment.

According to the present invention, if the unmanned aerial vehicle acquires the target control request of the unmanned aerial vehicle for requesting to perform flight control in a process of executing the target flight tasks by the unmanned aerial vehicle, the unmanned aerial vehicle may detect the current energy consumption condition of the unmanned aerial vehicle in response to this target control request, calculate the remaining navigation parameters of the unmanned aerial vehicle indicating a time of the unmanned aerial vehicle to navigate before landing according to the current energy consumption data of the current energy consumption condition of the unmanned aerial vehicle and the current ground speed of the unmanned aerial vehicle, and control the unmanned aerial vehicle to execute the remaining flight tasks in the target flight tasks according to the remaining navigation parameters. That is, in the process of performing the flight tasks, the unmanned aerial vehicle can estimate the remaining flight time to ensure that it can land safely according to the flight information such as the current energy consumption data and the ground speed, so as to re-plan an execution mode of the remaining flight tasks in the currently executed flight tasks according to the remaining flight time, that is, to ensure that the unmanned aerial vehicle can complete the execution of the remaining flight tasks within the existing electric capacity, and to ensure that the unmanned aerial vehicle can land safely. Therefore, the problem of low stability of the unmanned aerial vehicle in the process of executing the flight tasks can be solved, thereby achieving an effect of improving the stability of the unmanned aerial vehicle in the process of executing the flight tasks.

Obviously, a person skilled in the art should understand that the above-mentioned modules or steps of the present invention can be implemented by a general computing device. They can be concentrated on a single computing apparatus or distributed on a network composed of a plurality of computing apparatuses. Optionally, they can be implemented by program codes executable by the computing apparatus, and thus can be stored in a storage apparatus to be executed by a computing apparatus. In addition, in some cases, the steps shown or described can be performed in a different order than here, or can be made into individual integrated circuit modules, or a plurality of modules or steps can be made into a single integrated circuit module. Therefore, the present invention is not limited to any specific hardware and software combination.

The foregoing content is only preferred embodiments of the present invention, but not intended to limit the present invention. Various alterations or changes may be made to the present invention for a person skilled in the art. Thus, any modification, equivalent replacement, improvement and so on made within the spirit of the present invention shall be encompassed by the protection scope of the present invention.

The invention claimed is:

1. A flight control method for an unmanned aerial vehicle, comprising:

acquiring a target control request of the unmanned aerial vehicle in a process of executing target flight tasks by the unmanned aerial vehicle, the target control request being configured to request flight control of the unmanned aerial vehicle;

detecting current energy consumption data of the unmanned aerial vehicle in response to the target control request, the current energy consumption data being configured to indicate a current energy consumption condition of the unmanned aerial vehicle;

calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and controlling the unmanned aerial vehicle to execute remaining flight tasks in the target flight tasks according to the remaining navigation parameters.

2. The flight control method according to claim 1, wherein the calculating the remaining navigation parameters of the unmanned aerial vehicle according to the current energy consumption data and the current ground speed of the unmanned aerial vehicle comprises:

determining a remaining flight time of the unmanned aerial vehicle according to the current energy consumption data, the remaining flight time being configured to indicate a time of the unmanned aerial vehicle permitted to continue flying while landing safely under a scenario of the current energy consumption data;

determining a product of the remaining flight time and the current ground speed as a remaining flight range of the unmanned aerial vehicle; and determining the remaining flight time and the remaining flight range as the remaining navigation parameters.

3. The flight control method according to claim 2, wherein the determining the remaining flight time of the unmanned aerial vehicle according to the current energy consumption data comprises:

determining a difference between remaining energy and a landing energy consumption as remaining flight energy, the remaining energy being configured to indicate a current electric capacity of the unmanned aerial vehicle, and the landing energy consumption being configured to indicate energy consumed by the unmanned aerial vehicle to land; and determining a ratio of the remaining flight energy to an energy consumption power as the remaining flight time, the energy consumption power being configured to indicate a current electricity consumption power of the unmanned aerial vehicle, and the current energy consumption data comprising the remaining energy, the landing energy consumption and the energy consumption power.

4. The flight control method according to claim 1, wherein the controlling the unmanned aerial vehicle to execute the remaining flight tasks in the target flight tasks according to the remaining navigation parameters comprises:

displaying prompt information on a control interface of the unmanned aerial vehicle, the prompt information being configured to prompt the current remaining navigation parameters of the unmanned aerial vehicle and a flight range permitted by using the remaining navigation parameters;

receiving a control instruction triggered on the control interface in response to the prompt information; and controlling the unmanned aerial vehicle to execute the remaining flight tasks in the target flight tasks according to the control instruction.

5. The flight control method according to claim 1, wherein the controlling the unmanned aerial vehicle to execute the remaining flight tasks in the target flight tasks according to the remaining navigation parameters comprises:

extracting the remaining flight tasks in the target flight tasks;

screening reference flight tasks permitted to be reached by the remaining navigation parameters from the remaining flight tasks according to a priority of each task in the remaining flight tasks; and controlling the unmanned aerial vehicle to land after executing the reference flight tasks.

6. The flight control method according to claim 1, wherein the detecting the current energy consumption data of the unmanned aerial vehicle comprises:

calculating an actual remaining electric capacity of the unmanned aerial vehicle according to a total electric capacity, a remaining electric capacity percentage and a reserved electric capacity of the unmanned aerial vehicle to obtain remaining energy, the remaining electric capacity percentage being displayed on a control interface of the unmanned aerial vehicle, the reserved electric capacity being an electric capacity reserved by the unmanned aerial vehicle, and the remaining energy being configured to indicate a current electric capacity of the unmanned aerial vehicle;

calculating energy consumed by the unmanned aerial vehicle to land by adopting a fixed-wing mode to obtain a landing energy consumption;

calculating a product of a discharge current and a discharge voltage of a battery on the unmanned aerial vehicle to obtain an energy consumption power, the energy consumption power being configured to indicate a current electricity consumption power of the unmanned aerial vehicle; and determining the remaining energy, the landing energy consumption and the energy consumption power as the current energy consumption data.

7. The flight control method according to claim 1, wherein the acquiring the target control request of the unmanned aerial vehicle comprises one of the following:

receiving the target control request sent by a controller corresponding to the unmanned aerial vehicle; and detecting a remaining electric capacity of the unmanned aerial vehicle; predicting whether the remaining electric capacity can complete the target flight tasks; and determining that the target control request is acquired in a case that the remaining electric capacity is predicted to be unable to complete the target flight tasks.

8. A flight control apparatus for an unmanned aerial vehicle, comprising:

an acquiring module, configured to acquire a target control request of the unmanned aerial vehicle in a process of executing target flight tasks by the unmanned aerial vehicle, the target control request being configured to request flight control of the unmanned aerial vehicle;

a responding module, configured to detect current energy consumption data of the unmanned aerial vehicle in response to the target control request, the current energy consumption data being configured to indicate a current energy consumption condition of the unmanned aerial vehicle;

a calculating module, configured to calculate remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and a control module, configured to control the unmanned aerial vehicle to execute remaining flight tasks in the target flight tasks according to the remaining navigation parameters.

9. The flight control apparatus according to claim 8, wherein the calculate the remaining navigation parameters of the unmanned aerial vehicle according to the current energy consumption data and the current ground speed of the unmanned aerial vehicle comprises:

determine a remaining flight time of the unmanned aerial vehicle according to the current energy consumption data, the remaining flight time being configured to indicate a time of the unmanned aerial vehicle permitted to continue flying while landing safely under a scenario of the current energy consumption data;

determine a product of the remaining flight time and the current ground speed as a remaining flight range of the unmanned aerial vehicle; and determine the remaining flight time and the remaining flight range as the remaining navigation parameters.

10. The flight control apparatus according to claim 8, wherein a determination of a remaining flight time of the unmanned aerial vehicle according to the current energy consumption data comprises:

determine a difference between remaining energy and a landing energy consumption as remaining flight energy, the remaining energy being configured to indicate a current electric capacity of the unmanned aerial vehicle, and the landing energy consumption being configured to indicate energy consumed by the unmanned aerial vehicle to land; and determine a ratio of the remaining flight energy to an energy consumption power as the remaining flight time, the energy consumption power being configured to indicate a current electricity consumption power of the unmanned aerial vehicle, and the current energy consumption data comprising the remaining energy, the landing energy consumption and the energy consumption power.

11. The flight control apparatus according to claim 8, wherein the control the unmanned aerial vehicle to execute the remaining flight tasks in the target flight tasks according to the remaining navigation parameters comprises:

display prompt information on a control interface of the unmanned aerial vehicle, the prompt information being configured to prompt the current remaining navigation parameters of the unmanned aerial vehicle and a flight range permitted by using the remaining navigation parameters;

receive a control instruction triggered on the control interface in response to the prompt information; and control the unmanned aerial vehicle to execute the remaining flight tasks in the target flight tasks according to the control instruction.

12. The flight control apparatus according to claim 8, wherein the control the unmanned aerial vehicle to execute the remaining flight tasks in the target flight tasks according to the remaining navigation parameters comprises:

extract the remaining flight tasks in the target flight tasks;

screen reference flight tasks permitted to be reached by the remaining navigation parameters from the remaining flight tasks according to a priority of each task in the remaining flight tasks; and control the unmanned aerial vehicle to land after executing the reference flight tasks.

13. The flight control apparatus according to claim 8, wherein the detect the current energy consumption data of the unmanned aerial vehicle comprises:

calculate an actual remaining electric capacity of the unmanned aerial vehicle according to a total electric capacity, a remaining electric capacity percentage and a reserved electric capacity of the unmanned aerial vehicle to obtain remaining energy, the remaining electric capacity percentage being displayed on a control interface of the unmanned aerial vehicle, the reserved electric capacity being an electric capacity reserved by the unmanned aerial vehicle, and the remaining energy being configured to indicate a current electric capacity of the unmanned aerial vehicle;

calculate energy consumed by the unmanned aerial vehicle to land by adopting a fixed-wing mode to obtain a landing energy consumption;

calculate a product of a discharge current and a discharge voltage of a battery on the unmanned aerial vehicle to obtain an energy consumption power, the energy consumption power being configured to indicate a current electricity consumption power of the unmanned aerial vehicle; and determine the remaining energy, the landing energy consumption and the energy consumption power as the current energy consumption data.

14. The flight control apparatus according to claim 8, wherein the acquire the target control request of the unmanned aerial vehicle comprises one of the following:

receive the target control request sent by a controller corresponding to the unmanned aerial vehicle; and detect a remaining electric capacity of the unmanned aerial vehicle; predict whether the remaining electric capacity can complete the target flight tasks; and determine that the target control request is acquired in a case that the remaining electric capacity is predicted to be unable to complete the target flight tasks.

15. An electronic apparatus, comprising a memory, a processor, and a computer program that is stored in the memory and operable on the processor, the processor being configured to implement the steps of a flight control method for an unmanned aerial vehicle when executing the computer program, wherein the flight control method for an unmanned aerial vehicle comprises:

acquiring a target control request of the unmanned aerial vehicle in a process of executing target flight tasks by the unmanned aerial vehicle, the target control request being configured to request flight control of the unmanned aerial vehicle;

detecting current energy consumption data of the unmanned aerial vehicle in response to the target control request, the current energy consumption data being configured to indicate a current energy consumption condition of the unmanned aerial vehicle;

calculating remaining navigation parameters of the unmanned aerial vehicle according to the current energy consumption data and a current ground speed of the unmanned aerial vehicle, the remaining navigation parameters being configured to indicate a navigation time of the unmanned aerial vehicle before landing, and the current ground speed being configured to indicate a current flight speed of the unmanned aerial vehicle relative to the ground; and controlling the unmanned aerial vehicle to execute remaining flight tasks in the target flight tasks according to the remaining navigation parameters.

16. The electronic apparatus according to claim 15, wherein the calculating the remaining navigation parameters of the unmanned aerial vehicle according to the current energy consumption data and the current ground speed of the unmanned aerial vehicle comprises:

determining a remaining flight time of the unmanned aerial vehicle according to the current energy consumption data, the remaining flight time being configured to indicate a time of the unmanned aerial vehicle permitted to continue flying while landing safely under a scenario of the current energy consumption data;

determining a product of the remaining flight time and the current ground speed as a remaining flight range of the unmanned aerial vehicle; and determining the remaining flight time and the remaining flight range as the remaining navigation parameters.

17. The electronic apparatus method according to claim 15, wherein a determination of a remaining flight time of the unmanned aerial vehicle according to the current energy consumption data comprises:

determining a difference between remaining energy and a landing energy consumption as remaining flight energy, the remaining energy being configured to indicate a current electric capacity of the unmanned aerial vehicle, and the landing energy consumption being configured to indicate energy consumed by the unmanned aerial vehicle to land; and determining a ratio of the remaining flight energy to an energy consumption power as the remaining flight time, the energy consumption power being configured to indicate a current electricity consumption power of the unmanned aerial vehicle, and the current energy consumption data comprising the remaining energy, the landing energy consumption and the energy consumption power.

18. The electronic apparatus according to claim 15, wherein the controlling the unmanned aerial vehicle to execute the remaining flight tasks in the target flight tasks according to the remaining navigation parameters comprises:

displaying prompt information on a control interface of the unmanned aerial vehicle, the prompt information being configured to prompt the current remaining navigation parameters of the unmanned aerial vehicle and a flight range permitted by using the remaining navigation parameters;

receiving a control instruction triggered on the control interface in response to the prompt information; and controlling the unmanned aerial vehicle to execute the remaining flight tasks in the target flight tasks according to the control instruction.

19. The electronic apparatus according to claim 15, wherein the controlling the unmanned aerial vehicle to execute the remaining flight tasks in the target flight tasks according to the remaining navigation parameters comprises:

extracting the remaining flight tasks in the target flight tasks;

screening reference flight tasks permitted to be reached by the remaining navigation parameters from the remaining flight tasks according to a priority of each task in the remaining flight tasks; and controlling the unmanned aerial vehicle to land after executing the reference flight tasks.

20. The electronic apparatus according to claim 15, wherein the detecting the current energy consumption data of the unmanned aerial vehicle comprises:

calculating an actual remaining electric capacity of the unmanned aerial vehicle according to a total electric capacity, a remaining electric capacity percentage and a reserved electric capacity of the unmanned aerial vehicle to obtain remaining energy, the remaining electric capacity percentage being displayed on a control interface of the unmanned aerial vehicle, the reserved electric capacity being an electric capacity reserved by the unmanned aerial vehicle, and the remaining energy being configured to indicate a current electric capacity of the unmanned aerial vehicle;

calculating energy consumed by the unmanned aerial vehicle to land by adopting a fixed-wing mode to obtain a landing energy consumption;

calculating a product of a discharge current and a discharge voltage of a battery on the unmanned aerial vehicle to obtain an energy consumption power, the energy consumption power being configured to indicate a current electricity consumption power of the unmanned aerial vehicle; and determining the remaining energy, the landing energy consumption and the energy consumption power as the current energy consumption data.

* * * * *